Patented Apr. 24, 1951

2,550,254

UNITED STATES PATENT OFFICE 2,550,254

PROCESS FOR EXTRACTION OF ANTIBIOTIC MATERIAL

Lloyd B. Jensen, Chicago, Ill., assignor to Swift & Company, Chicago, Ill., a corporation of Illinois No Drawing. Application April 5, 1946, Serial No. 659,881

5 Claims. (Cl. 167—65)

The present invention relates to the preparation of a potent antibiotic substance, and it has to do more particularly with the concentration of an antimicrobial substance of plant origin.

For some time it has been known that some pathogenic bacteria are destroyed when soil is inoculated therewith. This destruction of bacteria is due to certain bacteria or antibacteria substances contained in the soil. It is also well known that the putrefying bacteria responsible for food spoilage do not ordinarily develop in living tissues of plants and animals. The presence of antibodies in live animal tissues and of antibiotic substances in plants are thought to play an important part in establishing immunity in living organisms against microbes harmful to the organism. From time immemorial it was thought that certain medicines of herbal origin were of some therapeutic value. Pursuant to this knowledge, microbiologists have been seeking to isolate useful microorganisms and prepare antibacterial substances from natural sources which antibacterial materials, although disassociated from their environment, might be capable of combatting microorganisms harmful to man. Although living matter is known to contain substance of an antibacterial nature, it is impossible to predict whether or not portions of a living organism, for example a plant, will yield an effective antibacterial substance when subjected to known methods of separation, concentration, extraction, or purification; or if once isolated whether or not the antibacterial substance will be beneficial. As a result of this search for antibacterial agents, naturally occurring antibiotic substances have been prepared from plants, animal tissues, molds, actinomyces, yeast and bacteria, for example, penicillin from the mold *Penicillium notatum*, and gramicidin from certain soil bacteria. It is known that some of these substances are in themselves toxic, are for the most part heat labile, and while they might be lethal in small concentrations to certain types of bacteria, they are, on the other hand, ineffective against other types or strains of bacteria.

An object of the present invention is to provide a potent antibiotic substance of plant origin.

A further object of the invention is to provide an antibiotic substance which is not toxic.

A still further object of the invention is to provide an antibiotic substance which is heat stable.

Yet another object of the invention is to provide an antibiotic substance which may be employed as an effective preservative for food products.

Still another object of the invention is to provide an antibiotic material which is capable of inhibiting mold growth.

Other objects and advantages of the invention will be apparent from a description of the invention given below.

The present invention contemplates broadly the preparation of an antibiotic substance found to be naturally associated with tissues of the tree *Persea gratissima*, or *Persea americana*, commonly known as the avocado tree, including the fruit thereof. I have discovered that especially the pit or pith of the avocado fruit or pear yields an antibiotic substance of great potency, to be hereinafter more fully described. I have also found that the antibiotic substance produced from the avocado pit is lethal to those microorganisms largely responsible for clostridial and bacillary food spoilage, and staphylococcus food poisoning, and therefore may be used advantageously in the preservation of food products. My antibiotic substance has been found to destroy gasforming bacilli of the genus Bacillus, such as *Bacillus subtilis* (var. *niger*); molds of the genera Aspergillus and Penicillium, such as *Aspergillus glaucus*, and *Penicillium notatum*; the bacilli of the genus Clostridium, such as *Clostridium sporogenes*, the staphylococci, such as *Staphylococcus aureus*. I have also found my antibiotic substance to be lethal against the bacterial species *Achromobacter perolens*, the organism responsible for the production of a musty odor in eggs known as "hay eggs." While the antibacterial substance produced from the avocado pit is extremely effective against the aforesaid organisms, I have found that other organisms, for example, *Escherichia coli*, *Penicillium camemberti*, the *Pseudomonas fluorescens* and *Pseudomonas syncyanea* are more resistant thereto. It would be an extremely arduous, if not an impossible, task to ascertain the reponse of all the existing species and varieties of microorganisms to the herein described antibiotic material but the effects of this material against the microorganisms hereinabove mentioned illustrate the commercial and medical values thereof.

The invention contemplates treating a mixture of ground avocado piths or pits with a suitable solvent to recover the antibiotic substance from the avocado material. A colored powder remains after evaporating off the solvent and may advantageously be refined by treating again with a suitable solvent, such as ethanol.

The following examples illustrate preferred embodiments of the invention, and the tests falling thereunder illustrate the potency of the material obtained in accordance with the processes of the examples.

*Example 1.*—250 g. of avocado piths or pits (brand "Calavo") were peeled and ground finely in a small hand meat grinder. The pits were cream colored with a slight yellowish tinge when whole, but upon grinding the piths became red-orange in color and emitted a faint pleasant odor somewhat like a mixture of cinnamon and pine needles. The ground piths were covered with 500 cc. of acetone and held in a flask for 24 hours, the flask being shaken at intervals. The acetone solution was removed from the pith by filtration and the acetone was distilled off under a 29 inch vacuum at 45° C. The yellowish brown residue was dissolved in 50 cc. of 95 per cent ethanol, so as to remove the possibility of solvent toxicity and to prevent contamination. The alcohol also provides means for accurately measuring the strength of the antibiotic substance; thus, the use of 50 cc. of alcohol makes possible the establishment of an arbitrary standard unit of antibiotic substance, that is, 1 ml. of alcoholic extract to represent 5 g. of original plant material.

Two tests were then performed to evaluate the effectiveness of the product obtained in accordance with the process described in Example I.

*Test 1.*—One hundred milliliters of nutrient agar (obtained from Difco Laboratories, Detroit, Michigan) were inoculated with 0.2 ml. of a 20-hour broth culture of a food poisoning strain of *Staphylococcus aureus*, which had been tested on *Macacus rhesus* monkeys and found to produce enterotoxin. Plates were poured with this agar. A hole was bored in the center of the hardened agar so as to form a cup in the agar plates. The cups were then filled with aqueous dilutions of the antibiotic product (1 ml. of the product representing 5 g. of pith) and were incubated at 37° C. for 4 days. Although the inoculum was rather heavy so as to prevent good diffusion thereof through the agar, the areas of inhibition indicated in the following table were obtained.

*Table I*

| Dilution of Antibiotic product | Millimeters Zone of Inhibition |
| --- | --- |
| 1:10 | 9 |
| 1:50 | 5 |
| 1:100 | 4 |
| 1:500 | 8 |
| 1:1000 | 5 |
| 1:2000 | 3 |
| Control | 0 |

The control plate was prepared by pouring agar therein, and after the agar had hardened, a cup was formed by boring the agar. The cup was then filled with a 1:100 aqueous dilution of 95% ethanol. In the control plate, colonies of the Staphylococci were observed throughout the agar, while in the other plates containing the antibiotic material growth of bacteria began to be manifested at varying distances away from the edge of the cup. Thus in a 1:10 dilution, growth of the bacteria was first noticed 9 mm. from the edge of the cup; at 1:50 dilution, 5 mm. away; 1:100 dilution, 4 mm. away, etc. Presumably, the clear zone of inhibition characterized by the absence of bacterial growth represented the extent to which the antibiotic material had diffused through the agar.

The agar cup plate method is open to objections in evaluating the potency of an antibiotic or other antibacterial substance because the method depends in part upon rate of diffusion of the substance through the agar. Serial dilution methods in nutrient broth tubes, as described below, were then employed to demonstrate antibiotic action on bacteria.

*Test 2.*—In this test the potency of the antibiotic substance obtained from Example I was determined by serial dilutions of the extract in 10 cc. broth tubes and then inoculated with bacteria. Dilutions of the extract were made in broth tubes from 1:10 to 1:80,000 and inoculated with large loops of 24-hour broth cultures of a food poisoning strain of *Staphylococcus aureus* (50,000 cells). The test organism was inhibited at a dilution of 1:5000 after 7 days' incubation at 37° C. After 7 days all of the tubes showing no growth were used as inocula in nutrient agar plates, 0.1 cc. of the material in the broth tubes being transferred to each agar plate. No growth resulted in 3 days from these transfers, which shows that the antibiotic substance had killed the test bacteria in a 1:5000 dilution.

*Example II.*—340 g. of avocado piths ("Rancho-La Habra" brand) were ground under acetone and covered with acetone for 24 hours. The solvent was evaporated off under 27 inches of vacuum (water pump) at 40° C. and the residue taken up in 68 ml. of pure ethyl alcohol, so that each ml. of alcoholic solution represented 5 g. of piths.

The effectiveness of the bactericidal properties of the product obtained by means of the process described in Example II, was then tested according to the method of Test 2 of Example I; that is, serial dilutions of 10 cc. broth tubes were made, each tube inoculated with a large loopful of a broth culture of *Staphylococcus aureus* incubated for 24 hours at 37° C. The inoculated tubes were then allowed to incubate at 37° C. and were observed for growth at the end of 24, 48, and 120 hours. The following table gives the dilutions and results as to bacterial growth corresponding therewith after 24, 48, and 120 hours, the minus sign (—) indicating no growth, the positive sign (+) the presence of growing staphylococci.

*Table II*

| | Dilutions in Broth | | | | | | | | |
| --- | --- | --- | --- | --- | --- | --- | --- | --- | --- |
| | 10 | 100 | 500 | 1,000 | 2,000 | 5,000 | 10,000 | 20,000 | Control |
| 24 hours | — | — | — | — | — | — | — | — | + |
| 48 hours | — | — | — | — | — | — | — | — | + |
| 120 hours | — | — | — | — | — | — | + | + | + |

The tubes of the above test were allowed to incubate at 37° C. for 7 days. At the end of 7 days, the tubes up to and including 1:5000 dilutions showed no growth, and were used as inocula on nutrient agar plates by transferring into the agar plates 0.1 cc. of the material contained in the dilution tubes. After incubation for 3 days, no growth resulted in the agar plates, thus indicating that the antibiotic substance was an effective bactericide in 1:5000 dilutions. In dilutions higher than 1:5000, the antibiotic substance shows antiseptic or bacteriostatic properties up to and including a dilution of 1:40,000 observed after 24 hours' incubation.

The product (1 ml.=5 g. of pith) was then tested for potency against other species of bacteria and also molds. It was found that *Clostridium sporogenes* (National Canners' Association strain #3679) was killed in a 1:10,000 dilution in "Difco" peptone colloid tubes; species of genus Bacillus in 1:500 dilution in "Difco" nutrient broth; *Achromobacter perolens*, *Aspergillus glaucus* and *Penicillium notatum* also in 1:500 dilution, and another strain of *Staphylococcus aureus* in 1:10,000 dilution.

Although I have found that the pits of the fruit of the avocado tree are especially rich in a powerful antibiotic substance, other parts of the tree, such as the leaves, stalk, roots and meat of the fruit contain the antibacterial substance to a lesser extent, but sufficiently to show bacteriostatic, or antiseptic, properties.

The antibiotic substance contained in *Persea gratissima* is soluble in a number of solvents. Suitable solvent media are the polar solvents, such as acetone, methyl ethyl ketone, ethyl, propyl and butyl alcohols, dioxane, ethyl acetate; chlorinated solvents, such as carbon tetrachloride, trichloroethylene; hydrocarbons, such as pentane, hexane, etc. Since the antibiotic material isolated from the avocado plant is heat stable, solvent treating temperatures may range from room temperates to boiling temperature of the solvent. The type of solvent chosen affects the color of the dried product. For example, acetone gives a brownish red product; hexane and trichloroethylene, a yellow material; ethyl alcohol, methyl ethyl ketone, ethyl acetate, a red substance, etc.

It is obvious that many variations in the solvent treating process may be advantageously employed. To illustrate, the treatment may be carried out in one step, for example, with ethanol; mixtures of solvents and different temperatures may also be advantageously employed to increase efficiency. I have found it preferable to process the antibiotic substance contained in the avocado pit by a two-stage solvent process, involving, first, treating the substance by means of a primary solvent which is subsequently removed, and then, second, taking up the resulting residue with another solvent, so as to form a solution, which is a convenient form of using the product. I have found that acetone is a very effective primary solvent in producing the antibiotic substance from the plant tissue. After evaporating off the acetone, the preferred solution is made with ethanol. By using alcohol I may utilize its well-known properties, such as nontoxicity and ability to prevent contamination.

I have found the antibiotic substance to be slowly soluble in distilled water. When the alcoholic extract of pith is added to water or broth, a heavy brownish-yellow precipitate is formed immediately. If the alcoholic solution in broth or water is centrifugalized and dilutions made in broth tubes of both supernatant liquid and sediment which are then inoculated with bacteria, both supernantant liquid and sediment inhibit bacterial growth. For example, a 1:10 dilution of the alcoholic solution in broth was centrifugalized 30 minutes at high speed and dilutions made in broth tubes of both supernatant liquid and sediment. The tubes (10 ml.) were each inoculated with a loopful of a 20-hour broth culture of food poisoning *Staphylococcus aureus* and incubated at 37° C. Bacterial growth at 1:100, 1:500, 1:1000, 1:2000, 1:5000 and 1:7500 dilutions of the extract were observed after 24 and 48 hours. The following table lists the results, the minus sign indicating no growth, the positive sign indicating bacterial growth.

*Table III*

| Dilution | Supernatant Growth | | Precipitate Growth | |
|---|---|---|---|---|
| | 24 hrs. | 48 hrs. | 24 hrs. | 48 hrs. |
| 1:100 | − | − | − | − |
| 1:500 | − | − | − | − |
| 1:1000 | − | − | − | − |
| 1:2000 | − | − | − | − |
| 1:5000 | − | + | − | − |
| 1:7500 | − | + | − | − |
| Control | + | + | + | + |

The data tabulated above show that the precipitate is slowly soluble in water and is a powerful antibiotic substance.

In the processing of food products, a serious problem is that of food preservation, and although great strides have been made in improving the quality and keeping time of various food products by refrigeration, canning, curing, plant sanitation, etc., the problem of the preservation of food requires the constant attention of the food processor to improve long-established methods of treating food and to devise new means of food control.

Food spoilage is due principally to microbial action, and the microorganisms responsible for food deterioration are numerous. The sporing genera, Clostridium and Bacillus, for example, when contaminating food, cause food spoilage. Molds of the genera Penicillium and Aspergillus are also responsible for much food spoilage. In addition to food spoilage, a serious concern of the food handler is food poisoning, which is often of an insidious nature because food products contaminated with harmful bacteria often appear organoleptically sound and wholesome. Among the food poisoning bacteria, the most common food poisoner is the staphylococcus. This organism is widespread in nature, and is believed to be responsible for over 90 per cent of food poisoning cases in the United States, in addition to its being responsible for many infections in man and animals.

The antibacterial substance of the present invention may be used to retard or prevent microbial growth in various food products. This material may advantageously be employed in treating meat products, such as hams, sausages and canned meats; filled pastries, such as cream puffs, chocolate eclairs, custards, etc.; canned vegetables to prevent swellings due, for example, to organisms of the genus Bacillus.

The invention will be more fully understood from the following description of a method of using my antibiotic substance, in connection with the curing of hams.

Within recent years there has been developed a curing process for meats and particularly hams known as a quick-cure which requires only a fraction of the time which was normally required by the old processes. Essentially the quick-cure process consists in pumping the pickling solution under pressure into the vascular system of the meat. By this means a ham can be cured in a period of time ranging from fifteen to eighteen days, rather than the sixty to ninety days required by the old processes in which the meats were usually immersed in a bath of the pickling fluid.

There has risen, however, as the result of extensive commercial use of the quick-curing method an attendant serious health problem. The hams and other meats cured by the older immersion processes were extremely resistant to the development of pathogenic bacteria, of which various representatives of the Staphylococci may be mentioned as typical, and the general public has come to rely on this property in its eating and storage habits. Hams processed by quick-curing, on the other hand, have resulted in a meat product which, though highly satisfactory when fresh, is not nearly so resistant to these organisms, and numerous cases of food poisoning have resulted from the general public's unfamiliarity with this fact.

As hereinbefore mentioned, we have found that the antibiotic reagent herein described is lethal to a number of microbes in dilution of 1:5000, based on the arbitrary unit that 1 ml. of solution is equivalent to 5 g. of the source material, or original pith. Therefore, the addition of one part of the solution to 5000 parts of the conventional pickling solution will result in a meat product cured therewith which has a very marked increase in resistance to the development of pathogenic organisms.

The following is an example of a curing pickle stock, which may be used in a process for quick-curing ham when provided with antibiotic substance in the proportions outlined above; that is, the antibiotic substance is added in an amount such as to effect a 1:5000 dilution of the antibiotic material, based on the arbitrary standard herein described (1 ml.=5 g. of pith).

To 100 gallons of a 90° Salometer solution there are added:

7 lbs. sodium nitrate
10 oz. sodium nitrite
20 lbs. sugar
75.7 cc. antibiotic solution The following experiments will further illustrate the practical application of my invention. An amount of pickle was inoculated with a large number of a food poisoning type of *Staphylococcus aureus* organisms which would represent the most unfavorable conditions which could possibly be encountered. The pickle was then separated into two equal portions, and to one portion sufficient amount of avocado product was added to form a 1:5000 dilution of the product. To the other portion of pickle no antibiotic substance was added. Twelve hams were then cured by the quick-curing method—six of them with pickle containing the antibiotic substance and six with pickle without the substance. The hams were then smoked according to ordinary processes. The hams were incubated at 99° F. and at the end of two weeks the six hams containing the antibiotic treated hams did not harbor viable staphylococci, while the other hams showed the presence of viable staphylococci.

Luncheon meat was cured according to conventional methods in which the antibiotic substance was present in a 1:5000 dilution. The meat product was placed in 6 six-pound cans and retorted to an inside temperature of 155° F. and also incubated at 99° F. After 30 days of incubation, no swelling of the cans could be observed. The control cans swelled in one week.

A dry acetone solution of product from 60 g. of avocado pith was fed to four white rats for six days. The animals consumed 600 g. of ground meat to which was added 1 per cent of the product. The animals showed no symptoms of toxicity and there were no losses in weight.

Obviously, many modifications and variations of the invention, as hereinbefore set forth, may be made without departing from the spirit and scope thereof, and therefore only such limitations should be imposed as are indicated in the appended claims.

I claim:

1. A process of preparing a powerful antibiotic substance which comprises comminuting the fruit pit of the tree *Persea gratissima*, treating the said fruit pit with acetone at a temperature not substantially in excess of room temperature to form a non-aqueous solution of the antibiotic material, separating the solution from the insoluble residue, and reducing the solution to dryness by subjecting the said solution to distillation at a reduced pressure to obtain a powerful antibiotic substance.

2. A process of preparing a powerful antibiotic substance which comprises comminuting the fruit pit of the tree *Persea gratissima*, extracting the said fruit pit with acetone at about room temperature to form a non-aqueous solution of the antibiotic substance, separating the said solution from the acetone insoluble residue, and reducing the solution to dryness by distilling at a reduced pressure to obtain a powerful antibiotic material.

3. A process of preparing a powerful antibiotic substance which comprises comminuting the fruit pit of the tree *Persea gratissima*, extracting the said fruit pit at about room temperature with at least approximately twice its weight of acetone to remove substantially all the acetone soluble material from the said fruit pit and form a substantially non-aqueous solution of the antibiotic substance, separating the said solution from the acetone insoluble material, and reducing the said solution to dryness by subjecting the solution to distillation at a reduced pressure substantially below atmospheric pressure and at a temperature substantially below the boiling point of acetone at atmospheric pressure to form a dry powerful antibiotic substance.

4. The process of preparing a powerful antibiotic substance which comprises comminuting the fruit pit of the tree *Persea gratissima*, immersing the said fruit pit in about twice its weight of acetone at about room temperature and allowing the said fruit pit to stand in said acetone for approximately 24 hours with intermittent agitation to remove substantially all the acetone soluble material of the said fruit pit and form a substantially non-aqueous solution of the antibiotic substance, separating the said solution from the acetone insoluble material, and reducing the said solution to dryness by subjecting the said solution to distillation under a high vacuum and at a temperature substantially below the boiling point of acetone at atmospheric pressure to form a dry powerful antibiotic material.

5. A process substantially as in claim 4 wherein the vacuum is about 29 inches of mercury and the temperature is about 45° C.

LLOYD B. JENSEN.

(References on following page)

REFERENCES CITED

The following references are of record in the file of this patent:

UNITED STATES PATENTS

| Number | Name | Date |
|---|---|---|
| 1,417,771 | Schamberg et al. | May 30, 1922 |
| 1,635,302 | Alsberg | July 12, 1927 |
| 2,084,864 | Paddock | June 22, 1937 |
| 2,131,394 | Test | Sept. 27, 1938 |
| 2,180,750 | Urbain | Nov. 21, 1939 |
| 2,241,030 | Hess | May 6, 1941 |
| 2,399,840 | Wachtel | May 7, 1946 |

OTHER REFERENCES

Bilger et al.: Annual Report Hawaii Agr. Exp. Sta. 193, pp. 14–17 (1932).

Costa et al.: Bol. Assoc. Bras. Farm., vol. 15, pp. 393–405 (1934).

Khouvine et al.: Compt. rend., vol. 206, pp. 917–919 (1938).